United States Patent

Ando

[15] 3,701,850

[45] Oct. 31, 1972

[54] ADAPTER DEVICE FOR AN AUTOMATIC TELEPHONE ANSWERING APPARATUS

[72] Inventor: Shizuo Ando, Tokyo, Japan

[73] Assignee: Pioneer Electronic Corporation, Tokyo, Japan

[22] Filed: Dec. 29, 1970

[21] Appl. No.: 102,497

[30] Foreign Application Priority Data

Dec. 29, 1969 Japan ........................44/2088

[52] U.S. Cl. ..................................................179/6 C

[51] Int. Cl. ..............................................H04m 1/64

[58] Field of Search............179/6 C, 6 E, 100 DR, 179/1 C, 2 C, 2 A

[56] References Cited

UNITED STATES PATENTS

| | | | |
|---|---|---|---|
| 3,193,620 | 7/1965 | Marheine | 179/6 E |
| 2,846,505 | 8/1958 | Keith et al | 179/6 C |

*Primary Examiner*—James W. Moffitt
*Assistant Examiner*—Raymond F. Cardillo, Jr.
*Attorney*—Sughrue, Rothwell, Mion, Zinn & Macpeak

[57] ABSTRACT

An adapter device connected between an automatic telephone answering apparatus and plural telephone lines, which connects the automatic telephone answering apparatus to the telephone line of a called telephone, so that the apparatus can be used to the best advantage.

7 Claims, 2 Drawing Figures

ADAPTER DEVICE FOR AN AUTOMATIC TELEPHONE ANSWERING APPARATUS

BACKGROUND OF THE INVENTION

This invention relates generally to an automatic telephone answering apparatus, and more particularly to an adapter device connected between an automatic telephone answering apparatus and plural telephone lines.

Prior art automatic telephone answering apparatuses may be used with only one telephone and can not be used with plural telephones.

SUMMARY OF THE INVENTION

It is, therefore, the main object of this invention to provide an adapter device for an automatic telephone answering apparatus whereby the apparatus can be connected to plural telephone lines.

Another object of the present invention is to provide an adapter device for an automatic telephone answering apparatus whereby the apparatus can be used efficiently.

A further object of the present invention is to provide an adapter device for an automatic telephone answering apparatus which connects a predetermined telephone line to the apparatus even if two or more telephones are simultaneously called.

Still further objects, features and advantages of the present invention will become apparent from the following description and accompanying drawing.

DESCRIPTION OF THE PREFERRED EMBODIMENT

Figures 1, 2:
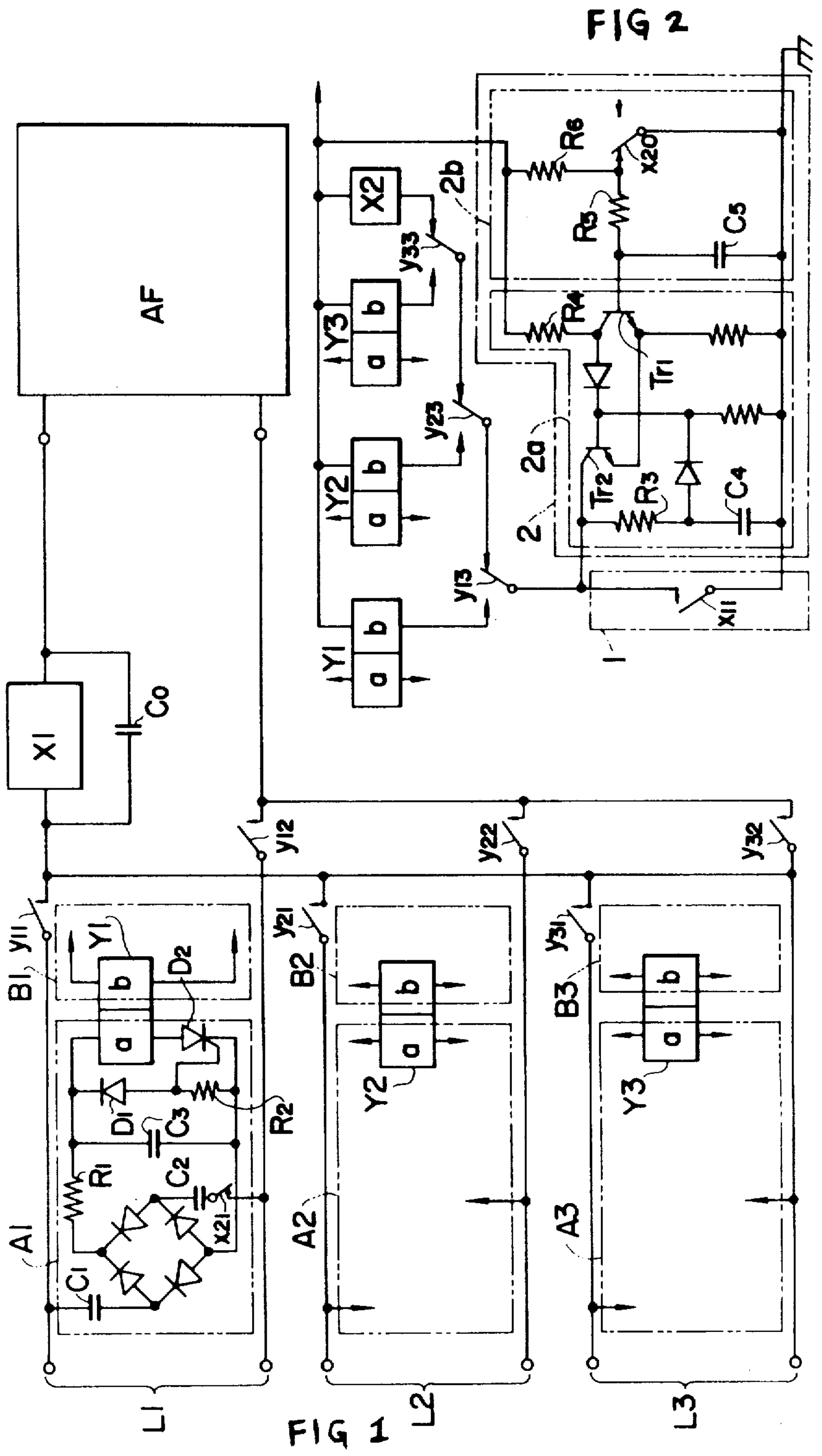
FIG. 1 shows a circuit of the preferred embodiment of the present invention.
FIG. 2 shows a detailed portion of the circuit of FIG. 1.

Referring to FIGS. 1 and 2, terminals $L_1$, $L_2$ and $L_3$ are connected to telephone lines respectively. Switching circuits $A_1$, $A_2$ and $A_3$ detect bell signals and connect a telephone line of a called telephone to an automatic telephone answering apparatus a few seconds after receiving the first bell signal. Switching circuits $A_1$, $A_2$ and $A_3$ have relays $Y_1$, $Y_2$ and $Y_3$, each relay having two windings. First windings a of the two windings are connected to the switching circuits $A_1$, $A_2$ or $A_3$, and second windings b are connected to other circuits $B_1$, $B_2$ and $B_3$. A relay $X_1$ is energized when a talking circuit of a telephone line is closed according to the answering operation of the automatic telephone answering apparatus. The relay $X_1$ holds one of the relays $Y_1$, $Y_2$ or $Y_3$ corresponding to the line of a called telephone, during the answering period of the automatic telephone answering apparatus. A condenser Co is connected in parallel with the relay $X_1$ and all alternating signals coming from the telephone line pass therethrough. A relay $X_2$ holds the adapter device in a stand-by state, and keeps the adapter device in an unoperating state when the automatic telephone answering apparatus AF is connected to the telephone line of a called telephone even if another telephone is subsequently called. Further, the relay $X_2$ initiates a timer circuit 2b of a holding circuit 2. The holding circuit 2 maintains the operation of one of the relays $Y_1$, $Y_2$ or $Y_3$ for a certain period of time (usually about ten seconds), the operated relay corresponding to the telephone line of the called telephone. A switching circuit 2a of the holding circuit 2 is, for example, a Schmitt trigger circuit, wherein a transistor Tr1 is OFF and a transistor Tr2 is ON in a stand-by state. The contacts of relays, for example, are indicated in such a manner that *y*21 designates the contact is the first contact of the second relay. The other relay contacts are similarly designated.

When the adapter device is connected with an electric power source, an electric current flows through the relay $X_2$, self-holding contacts y33, y23 and y13 and transistor Tr2. Thereby the relay $X_2$ is energized and its contacts $X_{20}$, $X_{21}$, $X_{22}$ and $X_{23}$ are transferred as shown in the drawing so as to set the adapter device in the stand-by state awaiting bell signals. If bell signals are applied to the switching circuit $A_1$, rectified by a bridge rectifier through condensers $C_1$ and $C_2$, and charging condenser $C_3$ through a resistor $R_1$, the condenser $C_3$ is gradually charged and a Zener diode $D_1$ is turned ON when the voltage on condenser $C_3$ reaches the Zener breakdown voltage. Therefore, the voltage across a resistor $R_2$, which is a gate voltage of a thyristor $D_2$ is suddenly raised thereby causing the thyristor $D_2$ to turn ON. This energizes relay $Y_1$ and its contacts are thereby switched. By the contacts *y*11 and *y*12, the telephone line is connected to an automatic telephone answering apparatus AF, and by the contact *y*13, the second winding b of the relay Y1 is connected to the holding circuit 2. The relay $X_2$ is released and its contacts $X_{20}$, $X_{21}$, $X_{22}$ and $X_{23}$ are opened.

When the contact $X_{20}$ is opened by the releasing of the relay $X_2$, the timer circuit 2b starts its operation and a condenser $C_5$ is gradually charged. The relay Y1, which is energized by the switching circuit $A_1$, is held in the energized state by means of the transistor Tr2 of the holding circuit 2 during the timer period (about ten seconds) of the timer circuit *2b*. The automatic telephone answering apparatus AF which is connected to the telephone line detects bell signals and beings its answering operations. When a talking circuit of the telephone line is formed according to the answering operation, the relay $X_1$ is energized by a DC current of the telephone line and its contact $X_{11}$ is closed to maintain the operation of the relay $Y_1$ with the holding circuit 1 replacing holding circuit 2. The automatic telephone answering apparatus AF can be operated continuously during a certain time. After about one minute from the beginning of the answering operation, the operation is completed, and the talking circuit of the telephone line is opened, thereby releasing relay $X_1$ and opening contact $X_{11}$. The relay $Y_1$ is simultaneously released. Consequently, the condenser $C_4$ is charged, and about 0.5 seconds after the release of the relay $X_1$, the base voltage of Tr2 is raised enough to cause the transistor Tr2 to turn ON. The relay $X_2$ is energized and its contacts $X_{20}$, $X_{21}$, $X_{22}$ and $X_{23}$ are closed. The adapter device completes its operations and returns to the stand-by state to await the next call.

The operation of the holding circuit 2 will be explained in detail hereinafter. The condenser $C_5$ is gradually charged, from the beginning of the operation of the timer circuit *2b*. About ten seconds later, the transistor Tr1 which has been OFF is turned ON and the transistor Tr2 is turned OFF. Therefore, the automatic telephone answering apparatus AF finishes its answering operating and the talking circuit of the telephone line is opened. After the relay $X_1$ is released, the relay $Y_1$ is no longer held and its contacts y11, y12 and y13 are opened. The collector current of the transistor Tr2 flows through the relay $X_2$ and contacts y33, y23 and y13 charging condenser $C_4$, so that the base potential of the transistor Tr2 is raised. Consequently, the transistor Tr2 turns ON, about 0.5 second after releasing of the relay Y1, and the relay $X_2$ is energized. Its contact $X_{20}$, $X_{21}$, $X_{22}$ and $X_{23}$ are closed and the adapter device is returned to the stand-by state. In case the automatic telephone answering apparatus AF cannot operate in spite of the operation of the relay $Y_1$, or in case a calling party hands up the phone after sending out one or two bell signals, the adapter device can be returned to the stand-by state about ten seconds later. The self-holding contacts y33, y23 and y13 are connected in series, therefore the adapter device connects the automatic telephone answering apparatus with only one telephone line, even if two or more telephones are simultaneously called.

In the embodiment of this invention, the adapter device is applied to the automatic telephone answering apparatus, but it can be applied to a general receiving apparatus which is used with plural telephones.

This invention, as described hereinabove, has many benefits. First, one automatic telephone answering apparatus can be used with plural telephones.

Further, the adapter device of this invention can be adapted to general automatic telephone answering apparatuses without modifying the apparatuses.

Still further, the adapter device of this invention is connected between the automatic telephone answering apparatus and plural telephone lines connecting the apparatus to one telephone line directly, therefore it does not adversely affect the apparatus and the telephone lines.

Furthermore, the adapter device of this invention connects the automatic telephone answering apparatus with only one telephone line, even if two or more telephones are simultaneously called, therefore the device is not affected by simultaneous calls.

Furthermore, the adapter device of this invention can be returned to the stand-by state if the automatic telephone answering apparatus can not operate, or if a calling party hangs up his phone after sending out one or two bell signals.

What is claimed is:

1. An adapter device for an automatic telephone answering apparatus comprising:

a. a plurality of switching means, each one of said plurality of switching means coupled to one of a plurality of telephone lines, said switching means initiating operation of said device, b. a first relay means, energized by one of said switching means, for connecting one of said plurality of said telephone lines to said automatic telephone answering apparatus, c. a first holding means for holding said first relay means, d. a second relay means energized when said automatic telephone answering apparatus operates to answer by closing a talking circuit of said one telephone line, e. a second holding means which is energized by said second relay means for holding said first relay in lieu of said first holding means holding said first relay means, and f. a third relay means, said third relay means changing state in response to the operation of said one of said switching means, for disconnecting the others of said plurality of telephone lines and for initiating a timer circuit coupled to said first holding circuit.

2. An adapter device for an automatic telephone answering apparatus as set forth in claim 1, wherein said first holding means comprises a Schmitt trigger circuit and a time constant circuit whereby the operation of the Schmitt trigger circuit is held for period of time by said time constant circuit after the second relay means is released.

3. An adapter device for an automatic telephone answering apparatus as set forth in claim 1, wherein said first relay means comprises a holding contact and two windings, one of said windings being connected to said one switching means and the other of said windings being connected to said first and second holding means through said self-holding contact.

4. An adapter device for an automatic telephone answering apparatus as set forth in claim 3, in which said self-holding contact of said first relay means is connected in series between an electric power source and a connecting point wherein the first and second holding means are connected at said connecting point.

5. An adapter device for an automatic telephone answering apparatus as set forth in claim 3, wherein said self-holding contact of said first relay means and said third relay means are connected in series between the electric power source and a connecting point wherein said first and second holding means are connected at said connecting point.

6. An adapter device for an automatic telephone answering apparatus as set forth in claim 1, wherein said first relay means includes a self-holding contact and said first relay means is connected to said first and second holding means through said self-holding contact.

7. An adapter device for an automatic telephone answering apparatus as set forth in claim 6, wherein said self-holding contact of said first relay means connects a power source to a common point of said first holding means and said second holding means.

* * * * *